US008832531B2

(12) United States Patent
Shalvi et al.

(10) Patent No.: US 8,832,531 B2
(45) Date of Patent: Sep. 9, 2014

(54) ADAPTIVE OVER-PROVISIONING IN MEMORY SYSTEMS

(71) Applicant: Apple Inc., Cupertino, CA (US)

(72) Inventors: Ofir Shalvi, Ra'anana (IL); Naftali Sommer, Rishon le-Zion (IL); Yoav Kasorla, Kfar Netar (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/150,212

(22) Filed: Jan. 8, 2014

(65) Prior Publication Data

US 2014/0122787 A1 May 1, 2014

Related U.S. Application Data

(63) Continuation of application No. 13/908,018, filed on Jun. 3, 2013, now Pat. No. 8,650,461, which is a continuation of application No. 12/822,207, filed on Jun. 24, 2010, now Pat. No. 8,479,080.

(60) Provisional application No. 61/224,897, filed on Jul. 12, 2009, provisional application No. 61/293,814, filed on Jan. 11, 2010, provisional application No. 61/334,606, filed on May 14, 2010.

(51) Int. Cl.
*G11C 29/00* (2006.01)
*G06F 3/06* (2006.01)
*G06F 12/02* (2006.01)
*G06F 11/10* (2006.01)

(52) U.S. Cl.
CPC ............. *G06F 3/0688* (2013.01); *G06F 3/061* (2013.01); *G06F 12/023* (2013.01); *G06F 12/0223* (2013.01); *G06F 11/10* (2013.01); *G06F 12/02* (2013.01); *G06F 12/0246* (2013.01); *G06F 2212/7205* (2013.01); *G06F 3/0619* (2013.01); *G06F 3/0665* (2013.01)
USPC ........... 714/773; 714/763; 714/799; 711/102; 711/170; 711/126; 711/118; 711/203; 365/185.33

(58) Field of Classification Search
CPC . G06F 3/0665; G06F 12/023; G06F 12/0223; G06F 3/0688; G06F 3/061
USPC .......... 714/773, 763, 799; 711/170, 102, 126, 711/118, 203; 365/185.33
See application file for complete search history.

(56) References Cited

U.S. PATENT DOCUMENTS

| 8,239,735 | B2 * | 8/2012 | Shalvi et al. | 714/774 |
| 8,484,408 | B2 * | 7/2013 | Hetzler et al. | 711/103 |
| 8,583,868 | B2 * | 11/2013 | Belluomini et al. | 711/114 |
| 8,725,946 | B2 | 5/2014 | Petersen | |

(Continued)

*Primary Examiner* — John Trimmings
(74) *Attorney, Agent, or Firm* — Meyertons, Hood, Kivlin, Kowert & Goetzel, P.C.

(57) ABSTRACT

A method for data storage includes, in a memory that includes multiple memory blocks, specifying at a first time a first over-provisioning overhead, and storing data in the memory while retaining in the memory blocks memory areas, which do not hold valid data and whose aggregated size is at least commensurate with the specified first over-provisioning overhead. Portions of the data from one or more previously-programmed memory blocks containing one or more of the retained memory areas are compacted. At a second time subsequent to the first time, a second over-provisioning overhead, different from the first over-provisioning overhead, is specified, and data storage and data portion compaction is continued while complying with the second over-provisioning overhead.

20 Claims, 5 Drawing Sheets

(56) References Cited

U.S. PATENT DOCUMENTS

| | | |
|---|---|---|
| 2009/0210620 A1 | 8/2009 | Jibbe |
| 2010/0115175 A9 | 5/2010 | Zhuang et al. |
| 2011/0264843 A1* | 10/2011 | Haines et al. ............... 711/103 |
| 2011/0283049 A1* | 11/2011 | Kang et al. ................. 711/103 |
| 2012/0117309 A1* | 5/2012 | Schuette ..................... 711/103 |
| 2012/0284587 A1* | 11/2012 | Yu et al. ..................... 714/773 |
| 2013/0191578 A1 | 7/2013 | Goss |

* cited by examiner

ADAPTIVE OVER-PROVISIONING IN MEMORY SYSTEMS

CROSS-REFERENCE TO RELATED APPLICATIONS

This application is a continuation application of U.S. patent application Ser. No. 13/908,018, filed Jun. 3, 2013, which is a continuation application of U.S. patent application Ser. No. 12/822,207, filed Jun. 24, 2010, which claims the benefit of U.S. Provisional Patent Application 61/224,897, filed Jul. 12, 2009, U.S. Provisional Patent Application 61/293,814, filed Jan. 11, 2010, and U.S. Provisional Patent Application 61/334,606, filed May 14, 2010, whose disclosures are incorporated herein by reference.

FIELD OF THE INVENTION

The present invention relates generally to memory devices, and particularly to methods and systems for memory over-provisioning.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume either of two possible programming levels. Higher-density devices, often referred to as Multi-Level Cell (MLC) devices, store two or more bits per memory cell, i.e., can be programmed to assume more than two possible programming levels.

SUMMARY OF THE INVENTION

An embodiment of the present invention that is described herein provides a method for data storage, including:

in a memory that includes multiple memory blocks, specifying at a first time a first over-provisioning overhead, and storing data in the memory while retaining in the memory blocks memory areas, which do not hold valid data and whose aggregated size is at least commensurate with the specified first over-provisioning overhead;

compacting portions of the data from one or more previously-programmed memory blocks containing one or more of the retained memory areas; and at a second time subsequent to the first time, specifying a second over-provisioning overhead that is different from the first over-provisioning overhead, and continuing to store the data and compact the data portions while complying with the second over-provisioning overhead.

In some embodiments, storing the data at the first time includes encoding the data with an Error Correction Code (ECC) having a given redundancy level and storing the encoded data, and specifying the second over-provisioning overhead includes modifying the given redundancy level of the ECC. In another embodiment, storing the data at the first time includes encoding the data with an Error Detection Code (EDC) having a given size and storing the encoded data, and specifying the second over-provisioning overhead includes modifying the given size of the EDC.

In some embodiments, each memory block includes multiple memory cells, storing the data at the first time includes programming the data at a given number of bits per cell, and specifying the second over-provisioning overhead includes modifying the given number of bits per cell. In an embodiment, modifying the given number of bits per cell includes modifying a number of programming levels that are used for programming the memory cells. In another embodiment, modifying the given number of bits per cell includes modifying a coding rate of an Error Correction Code (ECC) that is used for encoding the data.

In yet another embodiment, storing the data at the first time includes storing N pages in a given memory block, and continuing to store the data at the second time includes storing M pages in the given block, M≠N. In still another embodiment, specifying the first and second over-provisioning overheads includes compressing the data and storing the compressed data at one of the first and second times, and storing the data without compression at the other of the first and second times.

In some embodiments, specifying the second over-provisioning overhead includes evaluating a predefined adaptation criterion with respect to at least some of the memory blocks, and setting the second over-provisioning overhead responsively to meeting the adaptation criterion. Evaluating the adaptation criterion may includes assessing a wear level of the at least some of the memory blocks, assessing an expected number of errors in the at least some of the memory blocks, and/or assessing a target storage reliability of the data in the at least some of the memory blocks. In an embodiment, the adaptation criterion depends on a preference between programming speed and a capacity of the memory. In another embodiment, the adaptation criterion depends on a frequency at which the data in the at least some of the memory blocks changes.

In a disclosed embodiment, storing the data includes accepting the data from a host for storage in a long-term storage device, and temporarily caching the data in the memory. Specifying the second over-provisioning overhead may include receiving from the host a request to free cache memory resources, and setting the second over-provisioning overhead in response to the request. In an embodiment, the data is received from a host for storage in the memory, the memory has a specified user capacity that is available to the host, and specifying the second over-provisioning overhead does not change the specified user capacity. In another embodiment, specifying the second over-provisioning overhead includes accepting an indication whether a data item that is stored in the memory is also stored in an additional storage location, and setting the second over-provisioning overhead responsively to the indication.

In yet another embodiment, the memory includes multiple memory devices each holding a subset of the memory blocks, and specifying the first and second over-provisioning overheads includes assigning one of the memory devices to serve as a spare memory device for replacing a faulty memory device, and, until the spare memory device replaces the faulty memory device, using the spare memory device to increase the first over-provisioning overhead. In still another embodiment, the memory includes multiple memory portions each holding a subset of the memory blocks, and specifying the first over-provisioning overhead includes individually specifying respective values of the first over-provisioning overhead separately for the memory portions. Specifying the respective values of the over-provisioning overhead may include setting a respective value of the first over-provisioning overhead for a given memory portion based on an expected endurance of the given memory portion.

In some embodiments, the memory includes multiple memory devices each holding a subset of the memory blocks, specifying the first over-provisioning overhead at the first time includes assigning each memory device a respective range of logical addresses, and specifying the second over-provisioning overhead at the second time includes re-assigning the logical addresses among the memory devices in response to a failure of a given memory device. In an embodiment, the memory includes multiple memory devices that are grouped in two or more groups, specifying the first over-provisioning ratio includes individually specifying respective values of the first over-provisioning overhead for the groups, and the method further includes selecting, responsively to the values, one of the groups for storing an input data item, and storing the input data item in the selected group.

In a disclosed embodiment, storing the data at the first time includes storing a first portion of the data at a first storage density and a second portion of the data at a second storage density that is different from the first storage density, and specifying the second over-provisioning ratio includes, at the second time, modifying a ratio between the first and second portions of the data. Storing the data may include storing frequently-changing data at the first storage density, and rarely-changing data at the second storage density. In an embodiment, compacting the portions of the data includes selecting the previously-programmed memory blocks for compaction based on an estimated endurance of the blocks.

There is additionally provided, in accordance with an embodiment of the present invention, a method for data storage, including:

in a memory that includes multiple memory blocks, predefining a range of logical addresses for storing data in the memory;

defining a number of physical storage locations in the memory blocks, such that data storage in the number of the physical storage locations retains in the memory blocks memory areas that do not hold valid data and whose aggregated size is at least commensurate with an initial over-provisioning overhead;

at a first time, storing the data in the memory by mapping the logical addresses to the number of the physical storage locations, while complying with the initial over-provisioning overhead, and compacting portions of the data from one or more previously-programmed memory blocks containing one or more of the retained memory areas; and at a second time subsequent to the first time, defining a modified over-provisioning overhead that is different from the initial over-provisioning overhead, modifying the number of the physical storage locations so as to comply with the modified over-provisioning overhead, and continuing to store the data by mapping the logical addresses to the modified number of the physical storage locations and compacting the data portions.

In some embodiments, defining and modifying the number of physical storage locations include applying a mapping process, which maps between the logical addresses and the physical storage locations and which varies in accordance with the over-provisioning overhead. Applying the mapping process may include defining a data structure for holding a mapping between the logical addresses and the physical storage locations, and modifying at least one of a size of the data structure and a variable range of the data structure in accordance with the over-provisioning overhead.

There is also provided, in accordance with an embodiment of the present invention, apparatus for data storage, including:

a memory, including multiple memory blocks; and a processor, which is configured to specify at a first time a first over-provisioning overhead and store data in the memory while retaining in the memory blocks memory areas, which do not hold valid data and whose aggregated size is at least commensurate with the specified first over-provisioning overhead, to compact portions of the data from one or more previously-programmed memory blocks containing one or more of the retained memory areas, and, at a second time subsequent to the first time, to specify a second over-provisioning overhead that is different from the first over-provisioning overhead and to continue to store the data and compact the data portions while complying with the second over-provisioning overhead.

There is further provided, in accordance with an embodiment of the present invention, apparatus for data storage, including:

a memory, including multiple memory blocks; and a processor, which is configured to predefine a range of logical addresses for storing data in the memory, to define a number of physical storage locations in the memory blocks, such that data storage in the number of the physical storage locations retains in the memory blocks memory areas that do not hold valid data and whose aggregated size is at least commensurate with an initial over-provisioning overhead, to store data in the memory at a first time by mapping the logical addresses to the number of the physical storage locations, while complying with the initial over-provisioning overhead, and compacting portions of the data from one or more previously-programmed memory blocks containing one or more of the retained memory areas, and, at a second time subsequent to the first time, to define a modified over-provisioning overhead that is different from the initial over-provisioning overhead, to modify the number of the physical storage locations so as to comply with the modified over-provisioning overhead, and to continue to store the data by mapping the logical addresses to the modified number of the physical storage locations and compact the data portions.

There is also provided, in accordance with an embodiment of the present invention, apparatus for data storage, including:

an interface, which is configured to communicate with a memory that includes multiple memory blocks; and a processor, which is configured to specify at a first time a first over-provisioning overhead and store data in the memory while retaining in the memory blocks memory areas, which do not hold valid data and whose aggregated size is at least commensurate with the specified first over-provisioning overhead, to compact portions of the data from one or more previously-programmed memory blocks containing one or more of the retained memory areas, and, at a second time subsequent to the first time, to specify a second over-provisioning overhead that is different from the first over-provisioning overhead, and to continue to store the data and compact the data portions while complying with the second over-provisioning overhead.

There is additionally provided, in accordance with an embodiment of the present invention, apparatus for data storage, including:

an interface, which is configured to communicate with a memory that includes multiple memory blocks; and a processor, which is configured to predefine a range of logical addresses for storing data in the memory, to define a number of physical storage locations in the memory blocks, such that data storage in the number of the physical storage locations retains in the memory blocks memory areas that do not hold valid data and whose aggregated size is at least commensurate with an initial over-provisioning overhead, to store data in the memory at a first time by mapping the logical addresses to the number of the physical storage locations, while complying with the initial over-provisioning overhead, and compacting portions of the data from one or more previously-programmed memory blocks containing one or more of the retained memory areas, and, at a second time subsequent to the first time, to define a modified over-provisioning overhead that is different from the initial over-provisioning overhead, to modify the number of the physical storage locations so as to comply with the modified over-provisioning overhead, and to continue to store the data by mapping the logical addresses to the modified number of the physical storage locations and compacting the data portions.

The present invention will be more fully understood from the following detailed description of the embodiments thereof, taken together with the drawings in which:

DETAILED DESCRIPTION OF EMBODIMENTS

Overview

Figure 1:
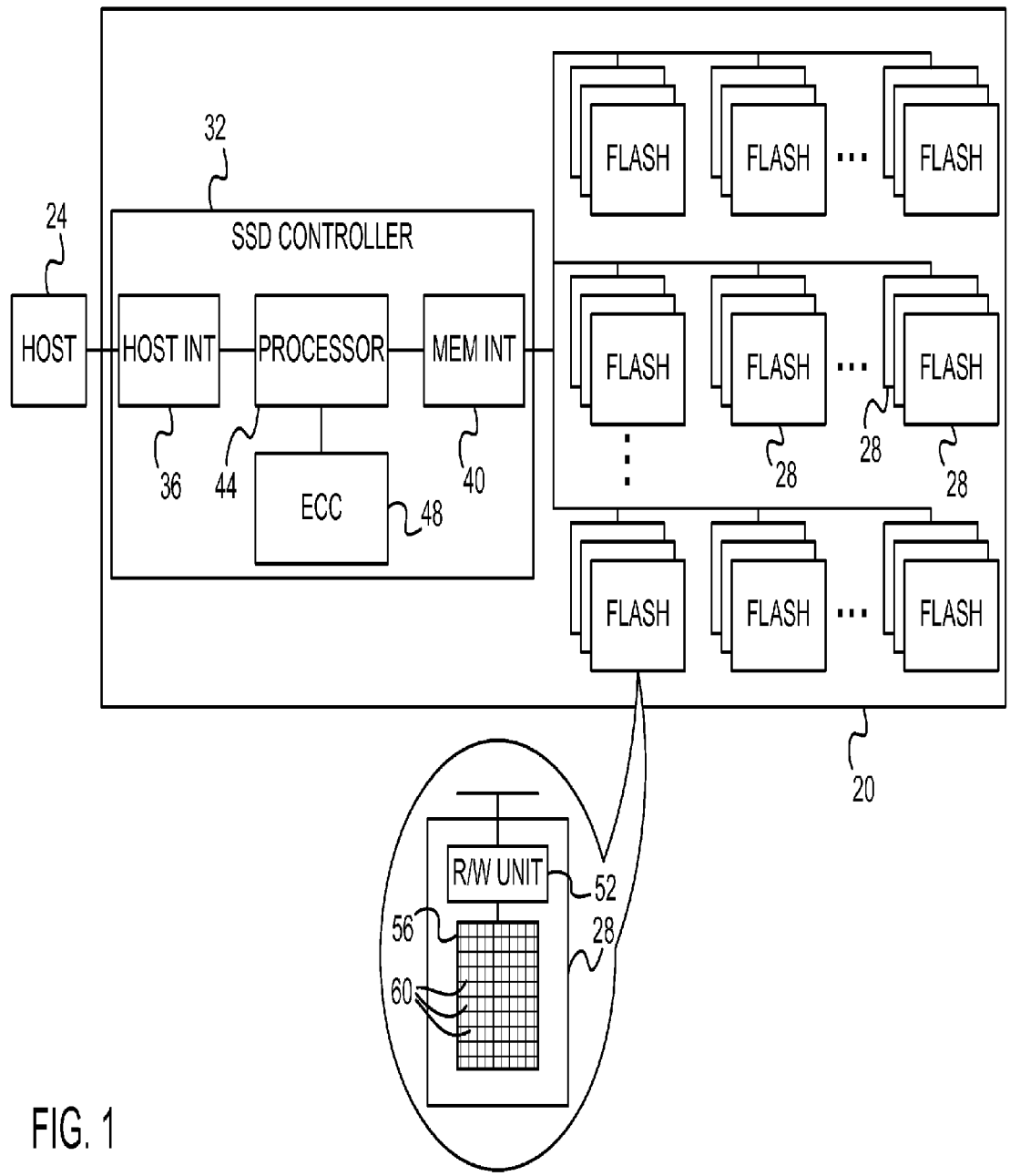
FIG. 1 is a block diagram that schematically illustrates a memory system, in accordance with an embodiment of the present invention.

In some types of non-volatile memory, such as NAND Flash memory, memory cells need to be erased before they can be programmed with new data. Erasure of memory cells is typically performed in blocks. As a result, modifying a single page or even a single bit may involve erasure and subsequent programming of an entire block, which can sometimes hold 1 MB of data or more. Some memory systems overcome this problem by using logical addressing. In such a system, when a page having a certain logical address is modified, the modified page is stored in a new physical location in another block, and the previous physical location of the page is marked as not holding valid data. As data storage progresses over time, more and more areas that do not hold valid data (and are therefore ready for erasure) appear as "holes" in the memory blocks. The system typically employs a "garbage collection" process, which compacts valid data from one or more partially-programmed blocks and creates empty blocks that are available for erasure and new programming.

In order to increase the efficiency of the garbage collection process, the memory system is often over-provisioned in terms of memory size. In other words, the actual physical storage capacity of the system is larger than the specified logical capacity available to a host. The aggregated size of the memory areas that do not hold valid data ("holes") is referred to as an over-provisioning overhead. The over-provisioning overhead can be specified as an over-provisioning ratio, which is defined as a fraction of the specified system capacity. For example, when the system uses an over-provisioning ratio of 5% and the memory is full from the host's perspective, each memory block is only 95% programmed, on average.

When the system is over-provisioned, garbage collection can be performed more efficiently. In other words, the number of copy operations per block compaction or consolidation can be reduced. The efficiency of the garbage collection process increases as a function of the over-provisioning ratio used in the system. Thus, increasing the over-provisioning ratio reduces the wearing of memory cells, and also increases the programming throughput. The effect of the over-provisioning overhead on cell wearing and storage throughput is particularly strong when the memory is full or nearly full.

Embodiments of the present invention that are described herein provide improved methods and systems for data storage. In some embodiments, a memory system comprises a processor, which accepts data from a host and stores the data in a memory comprising multiple memory blocks. The embodiments described herein refer mainly to Solid State Disks (SSDs), but the disclosed methods can also be used in various other types of memory systems.

In some embodiments, the processor modifies the over-provisioning overhead in an adaptive manner, so as to optimize the system performance for given circumstances. Typically, the processor specifies and applies a certain over-provisioning overhead, evaluates a predefined adaptation criterion, and changes the over-provisioning overhead (i.e., specifies a different over-provisioning overhead) if the criterion is met. Several example criteria are described herein. The adaptation criterion may consider, for example, the wear level and/or health level of the memory blocks. As another example, the adaptation criterion may depend on whether the stored data is critical or non-critical, or whether the data in question is already backed-up elsewhere.

Several example techniques for modifying the over-provisioning overhead are described herein. For example, when the stored data is first encoded with an Error Correction Code (ECC), the processor may trade between memory space allocated to ECC redundancy bits and memory space available for over-provisioning. As another example, the storage density (number of bits per cell) used for storing the data can be changed, thereby increasing or decreasing the memory space available for over-provisioning. As yet another example, the processor may trade between data compression and over-provisioning overhead. In some embodiments that are described herein, adaptive over-provisioning is applied in a memory system that serves as cache memory for a long-term storage device.

In some embodiments, the processor stores data in the memory using logical-to-physical address mapping. In these embodiments, the processor stores the data by mapping a predefined range of logical addresses to a certain number of physical storage locations in the memory blocks. In some embodiments, the processor modifies the over-provisioning overhead by modifying the number of physical storage locations without modifying the range of logical addresses.

In an example implementation, the processor decreases the over-provisioning overhead over the lifetime of the memory system. At the beginning of the system's life, the memory blocks are still fresh, and the number of read errors is expected to be small. Therefore, data can be stored with modest ECC redundancy, and more memory resources can be made available for over-provisioning. After the memory undergoes heavy cycling, e.g., after a number of years, higher ECC redundancy may be needed to achieve the desired storage reliability. The over-provisioning overhead can be reduced to enable the higher ECC redundancy. The disclosed techniques enable the system to achieve the highest possible storage throughput for the present conditions, or to achieve any other desired performance trade-off System Description FIG. 1 is a block diagram that schematically illustrates a memory system 20, in accordance with an embodiment of the present invention. System 20 accepts data for storage from a host 24 and stores it in memory, and retrieves data from memory and provides it to the host. In the present example, system 20 comprises a Solid-State Disk (SSD) that stores data for a host computer. In alternative embodiments, however, system 20 may be used in any other suitable application and with any other suitable host, such as in computing devices, cellular phones or other communication terminals, removable memory modules such as Disk-On-Key (DOK) devices, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple analog memory cells. In the present example, devices 28 comprise non-volatile NAND Flash devices, although any other suitable memory type, such as NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells, can also be used. Each memory device may comprise a packaged device or an unpackaged semiconductor chip or die. A typical SSD may comprise several devices, each providing a storage space of 4 GB. Generally, however, system 20 may comprise any suitable number of memory devices of any desired type and size. Although the system configuration of FIG. 1 comprises multiple memory devices, the methods and systems described herein can also be used in systems having only a single memory device.

System 20 comprises an SSD controller 32, which accepts data from host 24 and stores it in memory devices 28, and retrieves data from the memory devices and provides it to the host. SSD controller 32 comprises a host interface 36 for communicating with host 24, a memory interface 40 for communicating with memory devices 28, and a processor 44 that processes the stored and retrieved data. In particular, processor 44 carries out adaptive over-provisioning schemes that are described in detail below. In some embodiments, controller 32 encodes the stored data with an Error Correction Code (ECC). In these embodiments, controller 32 comprises an ECC unit 48, which encodes the data before stored in devices 28 and decodes the ECC of data retrieved from devices 28.

Each memory device 28 comprises a memory cell array 56. The memory array comprises multiple analog memory cells 60. In the context of the present patent application and in the claims, the term "analog memory cell" is used to describe any memory cell that holds a continuous, analog value of a physical parameter, such as an electrical voltage or charge. Any suitable type of analog memory cells, such as the types listed above, can be used. In the present example, each memory device 28 comprises a non-volatile memory of NAND Flash cells.

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

In the present example, each memory device 28 comprises a reading/writing (R/W) unit 52, which accepts data for storage from SSD controller 32, converts the data into analog storage values and writes them into memory cells 60 of that memory device. When reading data out of array 56, R/W unit 52 typically converts the storage values of memory cells 60 into digital samples having a resolution of one or more bits, and provides the digital samples to controller 32. Data is typically written to and read from the memory cells in groups that are referred to as pages. In some embodiments, the R/W unit can erase a group of cells 60 by applying one or more negative erasure pulses to the cells.

SSD controller 32, and in particular processor 44, may be implemented in hardware. Alternatively, the SSD controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and SSD controller 32 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of the memory devices are disposed. Further alternatively, some or all of the functionality of SSD controller 32 can be implemented in software and carried out by a processor or other element of the host system, or by any other type of memory controller. In some embodiments, host 24 and SSD controller 32 may be fabricated on the same die, or on separate dies in the same device package.

In an example configuration, memory cells 60 in a given array 56 are arranged in multiple rows and columns. The memory cells in each row are connected by word lines, and the memory cells in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks (also referred to as memory blocks or simply blocks, for brevity). In a typical two-bit-per-cell MLC device, each erasure block is on the order of 32 or 64 word lines, each comprising hundreds of thousands of memory cells. Each word line of such a device is often partitioned into four pages (odd/even order cells, least/most significant bit of the cells). Three-bit-per cell devices having 32 word lines per erasure block would have 192 pages per erasure block, and four-bit-per-cell devices would have 256 pages per block. Alternatively, other block sizes and configurations can also be used.

Some memory devices comprise two or more separate memory cell arrays, often referred to as planes. Since each plane has a certain "busy" period between successive write operations, data can be written alternately to the different planes in order to increase programming speed.

Adaptive Over-Provisioning of Memory Space

System 20 has a certain total (physical) capacity that memory devices 28 are capable of storing. Some of this total capacity is used for storing user data bits, i.e., data that is accepted for storage from host 24. Other portions of the total capacity may be used for other purposes, e.g., for storing information that is produced internally to system 20. For example, when the stored data is encoded with an ECC, some of the total capacity is used for storing redundancy bits of the ECC, produced by ECC unit 48. Additionally or alternatively, portions of the total capacity of system 20 can be used for storing any other suitable kind of information in addition to user data received from the host. Typically, host 24 is aware only of the specified user capacity of system 20 (e.g., the logical address space used for accessing the memory), and the remaining memory resources are hidden and not available to the host. In other words, the size of the address space available to the host for storing data in system 20 is the user capacity.

In system 20, the actual memory space that is used for storing data is larger than the specified (logical) capacity of the system. When storing data in the different memory blocks of system 20, processor 44 retains in the memory blocks some memory areas that do not hold valid data. The aggregated size of these memory areas (also referred to as "holes") is referred to as over-provisioning overhead. The over-provisioning overhead is typically expressed as an over-provisioning ratio, which is defined as a fraction of the specified logical system capacity. As explained above, the memory holes are often created when logical data pages are updated and therefore stored in other blocks.

The term "valid data" refers to any data that is useful in subsequent operation of the system. Valid data may comprise, for example, user data, ECC redundancy bits, and/or metadata or other information generated by the system. Thus, a memory area that does not hold any sort of valid data can be considered ready for erasure. Erasure of a memory area that does not hold valid data will not cause damage to any information that is stored in the system. For example, an area of this sort may hold older, obsolete versions of logical pages that were updated and stored in other physical locations.

The memory areas that do not hold valid data are typically distributed among the different memory blocks of the system. For example, when system 20 operates at an over-provisioning ratio of 5% and the memory is fully-programmed from the point of view of the host, only 95% of the pages in each memory block are actually programmed with valid data, on average. The exact percentage may vary from block to block, but on average, 5% of the pages in each block do not hold valid data. The over-provisioning overhead enables system 20 to maintain a pool of memory blocks that are (or can be) erased and ready for programming, by compacting or consolidating partially-filled memory blocks. In some embodiments, processor 44 modifies the over-provisioning ratio (i.e., modifies the aggregate size of the memory holes remaining in the memory blocks) in an adaptive manner, as will be explained in detail below.

Figure 2:
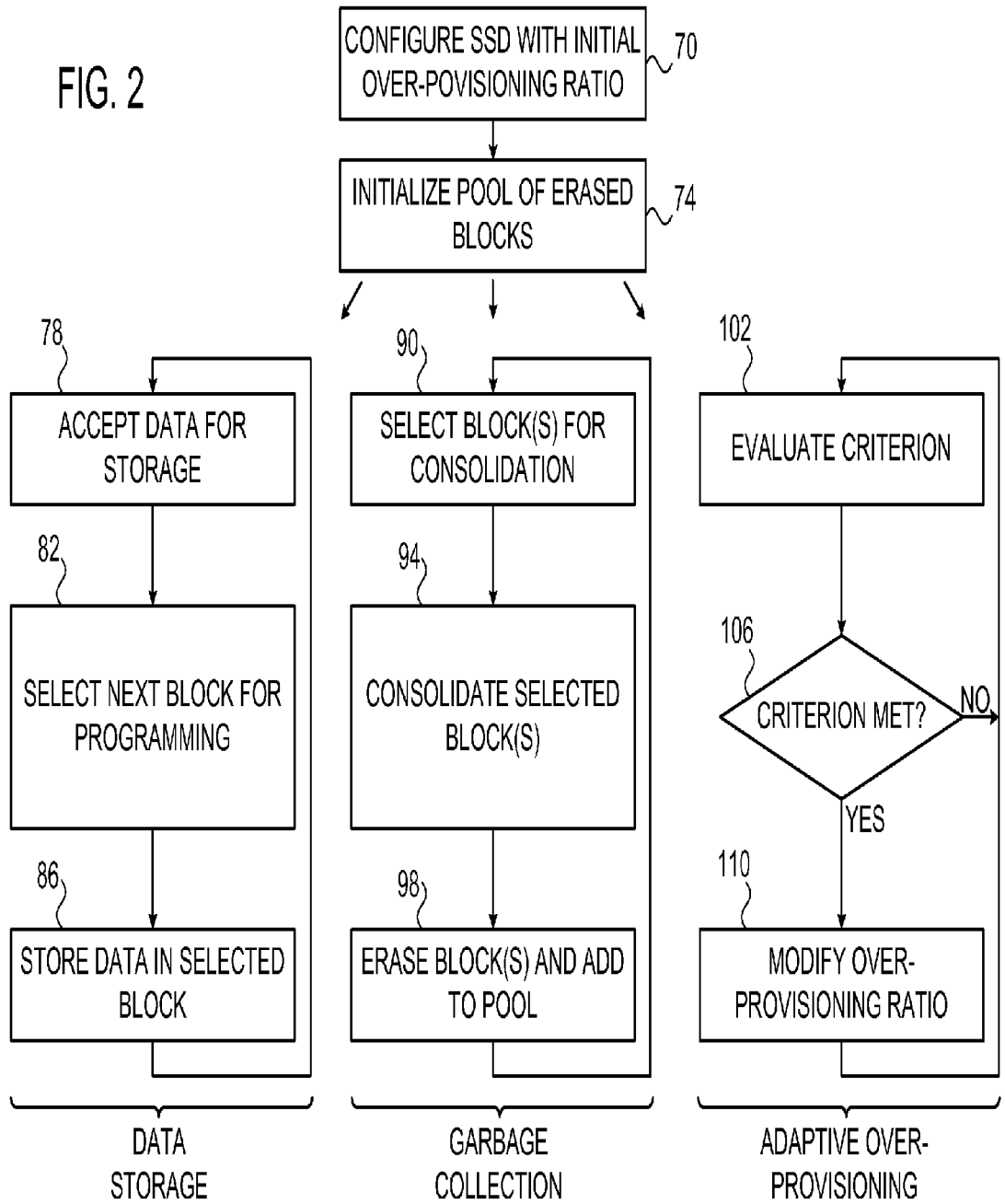
FIG. 2 is a flow chart that schematically illustrates a method for operating a memory, in accordance with an embodiment of the present invention.

FIG. 2 is a flow chart that schematically illustrates a method for storing data in memory devices 28 using adaptive over-provisioning, in accordance with an embodiment of the present invention. At initialization, processor 44 configures system 20 with a certain initial over-provisioning ratio, at an over-provisioning initialization step 70. A typical range of over-provisioning ratios is on the order of 5%-25%, although any other suitable value can also be used. Processor 44 initializes a certain set, or pool, of memory blocks that are erased and ready for programming, at a block initialization step 74. At this stage, system 20 is ready for storing data.

As noted above, memory devices 28 comprise multiple memory blocks, and each block comprises multiple pages. Programming is performed page by page, and erasure is performed en-bloc for each block. Thus, a given block may be empty (i.e., contain no valid data, such as immediately after erasure), fully-programmed (i.e., have all its pages programmed with valid data) or partially-programmed (i.e., have only part of its pages programmed with valid data). During operation, system 20 continually carries out three processes, namely data storage, garbage collection and adaptive over-provisioning. These processes are typically performed independently of one another, as shown in FIG. 2, although the performance of each process often affects the other processes.

In the storage process, processor 44 accepts data for storage from the host, and stores it in one or more selected memory blocks. Processor 44 accepts from host 24 user data for storage, at a user data input step 78. Processor 44 processes the user data, e.g., encodes the data with an ECC using ECC unit 48 and/or adds other sorts of management information. Processor 44 selects a given block for storing the data, at a next block selection step 82. Any suitable selection criteria can be used for this purpose. In some cases, processor 44 may select a block from the pool of erased blocks, i.e., a block that currently contains no data. In other cases, processor 44 may select a block that is partially-programmed but has sufficient space for storing the data in question. In other cases, processor 44 may select two or more blocks, either erased or partially-programmed, for storing the data. Processor 44 then stores the data in the selected block, at a storage step 86.

Note that the data storage process may produce blocks that are fragmented and partially-programmed, since when a certain logical page is updated, the previous version of the page becomes invalid and therefore fragments the block in which it is stored. The extent of partial programming and data fragmentation may depend, for example, on the kind of data programming by the host (e.g., sequential vs. random programming) and on the block selection criteria used by processor 44. Deletion of data by the host also contributes to data fragmentation and partial programming of blocks.

In the garbage collection process, processor 44 compacts portions of valid data from one or more partially-programmed blocks, so as to clear blocks for erasure. In an example embodiment, processor 44 selects two or more blocks for consolidation, at a consolidation selection step 90. Processor 90 may use any suitable selection criteria for this purpose. For example, the processor may select the most fragmented blocks, the blocks whose consolidation is closest to producing a fully-programmed block, or make any other suitable selection. Processor 44 consolidates the selected blocks, at a consolidation step 94. Consolidation is typically performed by copying the data from the selected block to one or more new blocks obtained from the pool of erased blocks. Alternatively, data can be copied from one of the selected blocks into non-programmed pages in another selected block. In yet another embodiment, a single block is selected for compaction, and its valid data is copied to another block. Processor 44 then erases the block or blocks whose data was copied elsewhere, at an erasure step 98. Processor 44 adds these blocks to the pool of erased blocks that are available for programming.

Note that the efficiency of the garbage collection (block compaction) process and the data storage process depends on the amount of over-provisioning overhead used in system 20. Consider, for example, a scenario in which the system uses a 5% over-provisioning ratio. In this case, if a fully-programmed block contains M bits, the system stores 5000·M bits of data in 5000/0.95≅5263 memory blocks instead of 5000. When the memory is full from the host's perspective, the memory blocks in system 20 are actually 95% programmed, on average. In this situation, clearing partially-programmed blocks by compaction involves a relatively high number of copy operations.

In contrast, consider another scenario in which the system uses a 15% over-provisioning ratio, i.e., assigns 5000/0.85≅5882 blocks for storing the 5000·M bits of data. In this scenario, when the memory is full from the host's perspective, the memory blocks are only 85% programmed, on average. Consolidating and clearing partially-programmed blocks in this scenario incurs a much smaller number of copy operations than in the former scenario of 5% over-provisioning.

Generally, the average number of additional programming operations needed per each write operation (also referred to as "write amplification") decreases with the over-provisioning ratio. Increasing the over-provisioning ratio increases the storage throughput of the system, at the expense of larger memory. In addition, a larger over-provisioning ratio increases the lifetime of the memory, reduces the power consumption of the storage process and reduces cell wearing, since it reduces the number of copy operations performed in block compaction. Decreasing the over-provisioning ratio, on the other hand, uses less memory space at the expense of degraded storage throughput, memory lifetime, power consumption and cell wearing.

In some embodiments, processor 44 adaptively modifies the over-provisioning overhead used in system 20, in order to optimize the system performance for given circumstances. In other words, processor 44 sets a certain over-provisioning ratio at a given point in time, and another over-provisioning ratio at a different point in time, based on a certain adaptation criterion. Typically, processor 44 evaluates the adaptation criterion, at a criterion evaluation step 102. Processor 44 checks whether the criterion is met, at a criterion checking step 106. If the criterion is met, processor 44 modifies the over-provisioning ratio, at an over-provisioning adaptation step 110.

Processor 44 may use any suitable criterion in order to decide when, and to what extent, to modify the over-provisioning ratio. The criterion is typically defined over at least some of the memory blocks. The criterion may consider, for example, the number of Programming and Erasure (P/E) cycles that the blocks have gone through or any other suitable measure of the wear level of the blocks. Additionally or alternatively, the criterion may consider the health level of the blocks, e.g., the likelihood of encountering data errors in the storage and retrieval process. As another example, processor 44 changes the over-provisioning ratio as a result of a system preference. For example, at a certain time it may be preferable to increase programming speed at the expense of capacity, in which case the processor sets a relatively high over-provisioning ratio is appropriate. At another time it may be preferable to increase capacity at the expense of programming speed, in which case the processor sets a relatively low over-provisioning ratio. Additionally or alternatively, any other suitable criterion can be used.

In some embodiments, processor 44 trades-off the amount of over-provisioning with the amount of ECC redundancy. In other words, processor 44 may divide the total storage capacity of system 20 between ECC redundancy and over-provisioning. For example, when the expected number of errors is relatively low (e.g., when the system is in the beginning of its life and the memory cells are not yet heavily cycled), processor 44 can define a relatively low ECC redundancy level (e.g., high ECC code rate) and assign more memory space for data storage at a higher over-provisioning ratio. When the average wear of the memory blocks increases, e.g., after several months or years of service or following a certain number of P/E cycles, processor 44 may decide to increase the ECC redundancy and therefore reduce the over-provisioning ratio. Note that the user capacity, as seen by the host, does not change throughout these adaptations.

Additionally or alternatively, processor 44 may modify the trade-off between ECC redundancy and over-provisioning ratio based on the required storage reliability of the data. When the specified storage reliability is low, processor 44 may reduce the ECC redundancy, and in return increase the over-provisioning ratio and improve the programming throughput. When the specified storage reliability is high, processor 44 may increase the ECC redundancy and decrease the over-provisioning ratio. Further additionally or alternatively, processor 44 may trade ECC redundancy vs. over-provisioning resources using any other suitable criterion.

Figure 3:
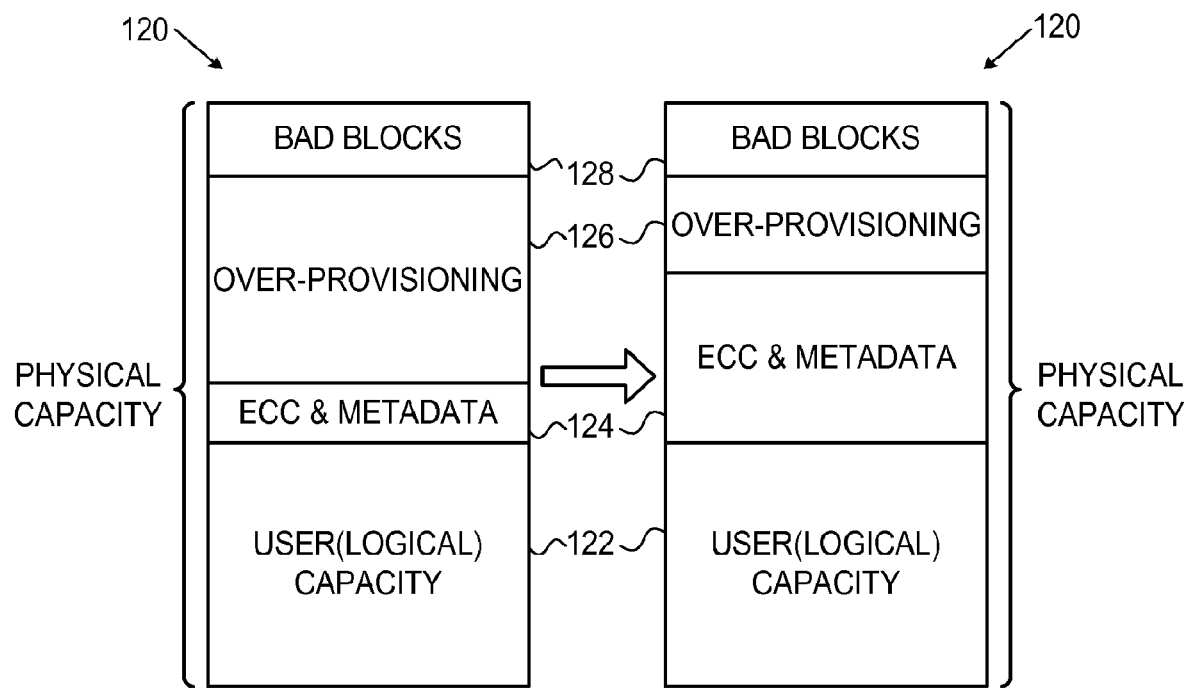
FIGS. 3-5 are diagrams that schematically illustrate adaptive over-provisioning schemes, in accordance with embodiments of the present invention.

FIG. 3 is a diagram that schematically illustrates an adaptive over-provisioning scheme, in accordance with an embodiment of the present invention. At any given point in time, processor 44 partitions a memory 120 between a user data storage area 122, an auxiliary storage area 124, an over-provisioning area 126 and a bad-block area 128. Area 122 is used for storing user data, and has a certain user (logical) capacity. Area 124 is used for storing information such as ECC redundancy, metadata and/or other auxiliary information. Area 126 is used for over-provisioning. Area 128 comprises blocks that are found to be faulty.

The left-hand-side of FIG. 3 shows a situation where, at a certain point in time, processor 44 sets a relatively low ECC redundancy level and a relatively large over-provisioning ratio. The right-hand-side of FIG. 3 illustrates a different point in time, at which processor 44 sets a relatively high ECC redundancy level and a relatively small over-provisioning ratio. Generally, processor 44 may increase and/or decrease the over-provisioning ratio over time, as appropriate.

The above-describe technique is also applicable to Error Detection Codes (EDC), either in addition to or instead of ECC. In alternative embodiments, processor 44 encodes the data for storage with a certain EDC, such as a Cyclic Redundancy Check (CRC) code. Processor 44 may set different trade-offs between EDC size (and thus error detection reliability) for over-provisioning overhead, i.e., increase the over-provisioning overhead while reducing EDC size (e.g., the number of bits allocated to EDC per page) or vice versa.

In alternative embodiments, processor 44 can modify the over-provisioning ratio by modifying the storage density per memory cell, i.e., the number of bits per cell. The storage density can be modified, for example, by modifying the number of programming levels (programming states) that are used for storing the data, and/or by modifying the ECC code rate. When using a larger number of bits per cell, a given data size can be stored in fewer memory pages, and more space can be used for over-provisioning.

Figure 4:
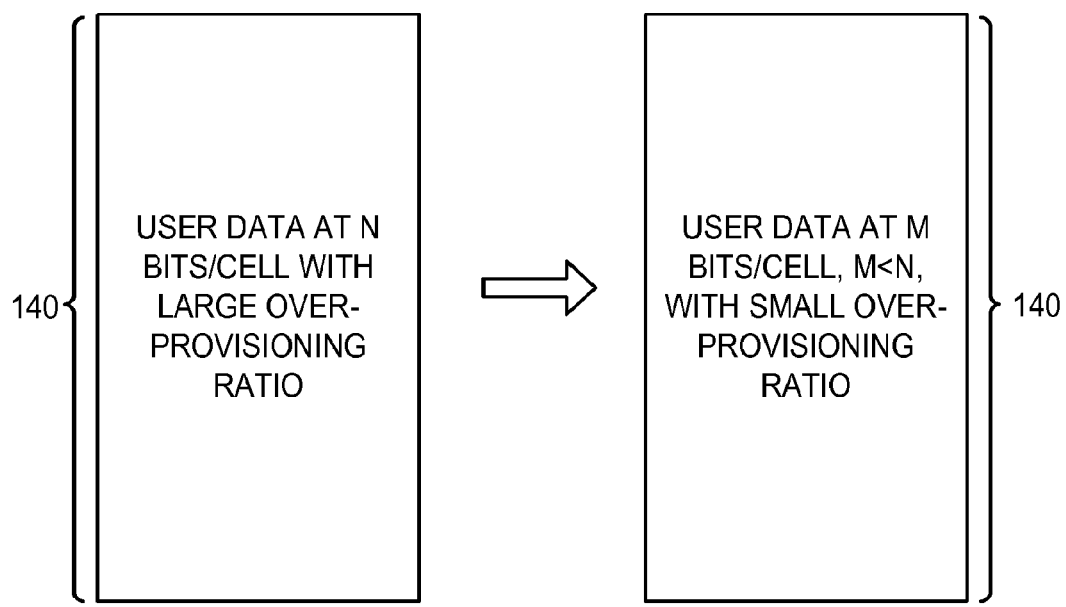

FIG. 4 is a diagram that schematically illustrates an adaptive over-provisioning scheme, in accordance with another embodiment of the present invention. In this example, system 20 is able to store data in a memory 140 at two or more different storage densities. FIG. 4 shows in which processor 44 supports at least two storage densities, denoted M and N bits/cell, wherein N>M. At a certain point in time, processor 44 stores the data at a density of N bits/cell, with a relatively large over-provisioning ratio. At a different point in time, processor 44 may decrease the storage density to M bits/cell, at the expense of having to decrease the over-provisioning ratio. Although the example of FIG. 4 shows a decrease in storage density over time, processor 44 may also increase the storage density over time, as appropriate.

In some embodiments, processor 44 modifies the over-provisioning ratio by modifying the number of programming levels that are used for storing data, at least for some of the word lines in some of the memory blocks. Processor 44 may increase or decrease the number of programming levels from any suitable initial number to any suitable modified number, such as from two levels to four levels, from four levels to eight levels, or vice versa.

Moreover, the initial and/or modified number of programming levels need not necessarily be a power of two. For example, processor 44 may initially store the data using eight programming levels (i.e., at a density of 3 bits/cell). At a later point in time, the processor may reduce the over-provisioning ratio by decreasing the number of programming levels to six, i.e., reducing the storage density to approximately 2.5 bits/cell. Alternatively, processor 44 may store data using three programming levels, or any other suitable number.

Figure 5:
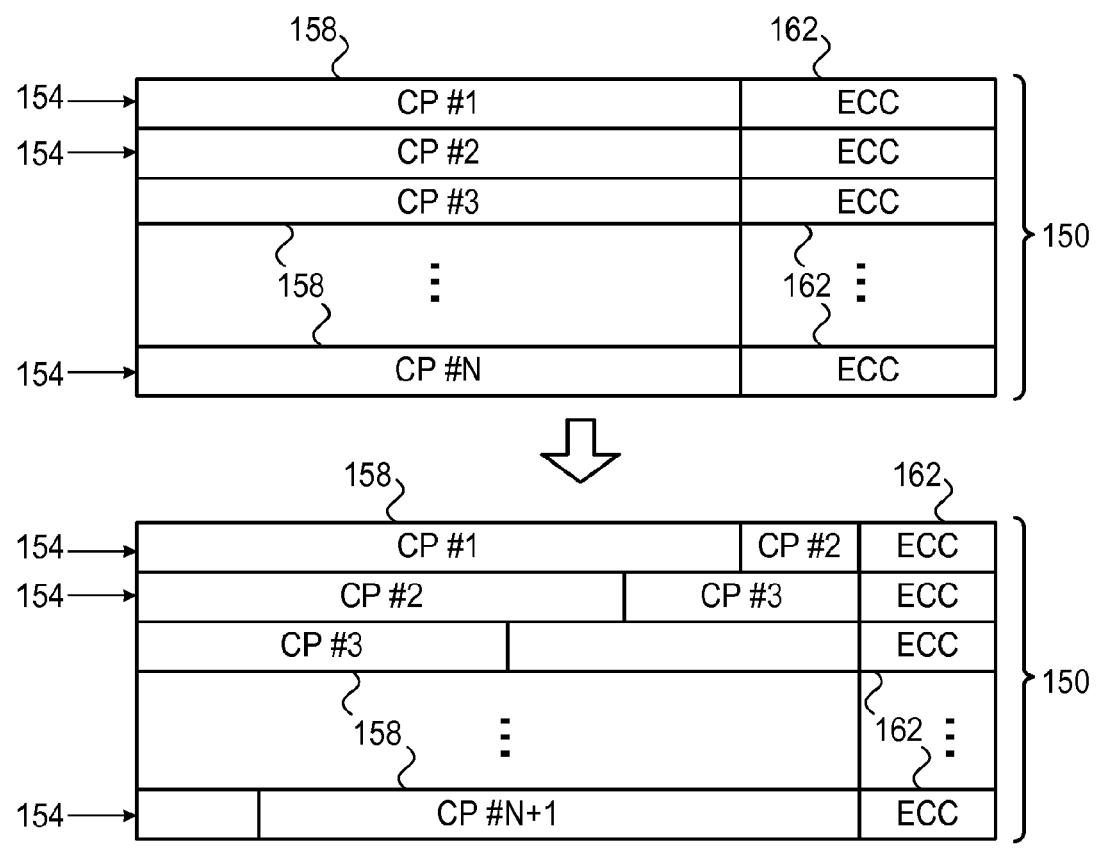

FIG. 5 is a diagram that schematically illustrates an adaptive over-provisioning scheme, in accordance with yet another embodiment of the present invention. In this embodiment, the data for storage is divided into controller pages 158, typically having a fixed size. FIG. 5 shows a memory block 150, which comprises N memory pages 154. At a certain point in time (shown at the top of the figure), each memory page holds a single controller page 158 and the corresponding ECC redundancy bits 162. In this configuration, block 150 can hold up to N controller pages.

At a different point in time, processor 44 reduces the ECC redundancy level, so that less memory cells in each memory page 154 are needed for storing ECC redundancy bits 162. As a result, more memory cells are available for increasing the over-provisioning ratio. For example, the bottom of FIG. 5 shows a scenario in which processor 44 stores N+1 controller pages 158 in the N memory pages 154, by using the extra space cleared by reducing the ECC redundancy. In this configuration, the N+1 controller pages are stored one after another in the available memory cells, regardless of memory page 154 boundaries. Thus, a given controller page 158 may be split between two different memory pages 154. When storing data in multiple blocks such as block 150, the higher number of controller pages per block enables memory 44 to store a given body of user data in fewer blocks, and therefore increase the over-provisioning ratio.

The example of FIG. 5 shows a configuration that stores N+1 controller pages in a block of N memory pages. Alternatively, processor 44 may store any other suitable number of pages, different than N, in an N-page block by modifying the ECC redundancy level.

In some embodiments, processor 44 decides whether or not to compress the user data prior to storage. The decision may be based, for example, on the type of data and/or wear level of the memory. If the data is compressed, processor 44 can use a relatively high over-provisioning ratio. Otherwise, a lower over-provisioning ratio is typically used. In an example scenario, processor 44 may apply data compression, and a high over-provisioning ratio, at the beginning of the system's lifetime. At a later point in time, processor 44 may store the data without compression, and reduce the over-provisioning ratio accordingly.

Further alternatively, processor 44 may modify the storage configuration used for storing data in the memory in any other suitable manner, in order to clear memory resources and increase the over-provisioning ratio. Example mechanisms for modifying the storage configuration are described, for example, in PCT International Publication WO 2007/132456, whose disclosure is incorporated herein by reference.

Adaptive Over-Provisioning using Logical-to-Physical Address Translation

In some embodiments, SSD controller 32 stores data in memory devices 28 using logical-to-physical address mapping. In these embodiments, host 24 exchanges data with the SSD controller by addressing a predefined range of logical addresses. Processor 44 in the SSD controller maintains a mapping between the logical addresses and a certain number of physical storage locations (e.g., physical pages) in the memory blocks of memory devices 28. Processor 44 stores incoming data by mapping the logical addresses to the physical storage locations.

In some embodiments, processor 44 adaptively modifies the over-provisioning overhead by modifying the number of physical storage locations without modifying the range of logical addresses. In a typical implementation, processor 44 initially defines a certain number of physical storage locations, so as to comply with a certain initial over-provisioning overhead. In other words, the initial number of physical storage locations is defined so as to retain a sufficient amount of memory areas that do not contain valid data (including user data, ECC redundancy and/or metadata), as derived from the initial over-provisioning overhead. Initially, the controller stores data and performs garbage collection using this initial logical-to-physical address mapping.

At a later point in time, processor 44 defines a modified over-provisioning overhead that is different from the initial over-provisioning overhead. In order to comply with the modified over-provisioning overhead, the processor modifies (increases or decreases) the number of physical storage locations that are used in the logical-to-physical address mapping. Typically, this modification is performed without modifying the range of logical addresses used between the SSD controller and the host. Processor 44 may modify the number of physical storage locations using any of the techniques described above, e.g., by trading-off ECC redundancy resources, by modifying the storage density (the number of bits/cell), or by performing data compression.

After modifying the number of physical storage locations, processor 44 updates the logical-to-physical address mapping accordingly, so as to comply with the modified over-provisioning overhead. Subsequent data storage and garbage collection are performed using thus updated mapping.

Typically, processor 44 defines and maintains a certain data structure (e.g., one or more tables) for holding the logical-to-physical address mapping. In some embodiments, upon modifying the over-provisioning overhead, processor 44 modifies the size of this data structure accordingly. Processor 44 may employ a logical-to-physical address mapping process that is designed to operate with a variable over-provisioning overhead. This process is typically used for data storage, data retrieval and garbage collection. In particular, such a process may use one or more logical-to-physical mapping tables whose size and/or variable range varies.

Adaptive Over-Provisioning in a SSD Used as Cache Memory

In some embodiments, a non-volatile memory system (e.g., SSD) is used as a cache memory for a long-term storage device (e.g., magnetic disk). The adaptive over-provisioning techniques described herein can be applied in such cache applications, as well. As noted above, adaptive over-provisioning is important in maintaining high storage throughput. In cache memory applications, applying adaptive over-provisioning techniques in the cache memory can increase the storage throughput of the entire storage system.

Figure 6:
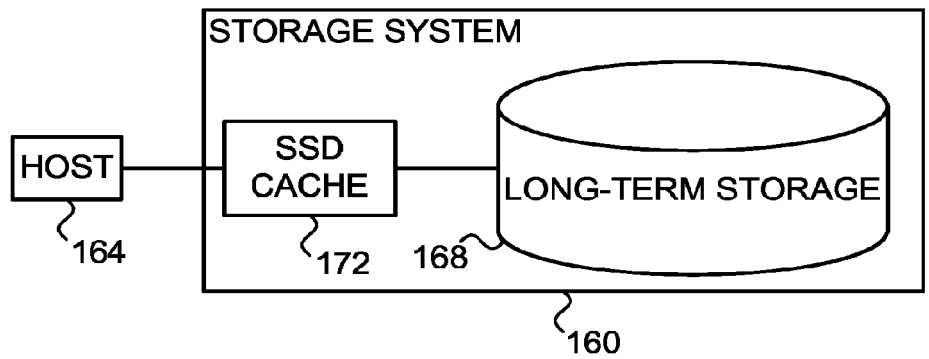
FIG. 6 is a block diagram that schematically illustrates a storage system, in accordance with an alternative embodiment of the present invention.

FIG. 6 is a block diagram that schematically illustrates a storage system 160, in accordance with an alternative embodiment of the present invention. System 160 stores data for a host 164. System 20 comprises a long-term storage device 168, such as a magnetic disk or any other suitable storage device. System 160 further comprises an SSD 172, which temporarily caches data items that are sent from the host for storage in storage device 168. In the present example, SSD 172 operates in a "write through" mode. In this mode, each data item that is received from host 164 is stored in storage device 168 and also cached in SSD 172. SSD 172 may be similar to system 20 of FIG. 1 above. In some embodiments, SSD 172 adaptively modifies the over-provisioning overhead it uses when caching data items. Any of the adaptive over-provisioning schemes described above can be used for this purpose.

In some embodiments, host 164 may request SSD 172 to delete some of the cached data items in order to free cache memory resources. Various storage protocols support "cache trim" commands, and host 164 may use such a command for this purpose. Host 164 may issue a trim command to SSD 172, for example, upon detecting that the storage throughput of system 160 has deteriorated, or upon deciding that higher throughput is desired. In response to a trim command, SSD 172 may delete one or more of the cached data items, and use the released memory space to increase the over-provisioning ratio. The higher over-provisioning overhead helps to improve the storage throughput of SSD 172, and therefore of system 160 as a whole.

Figure 7:
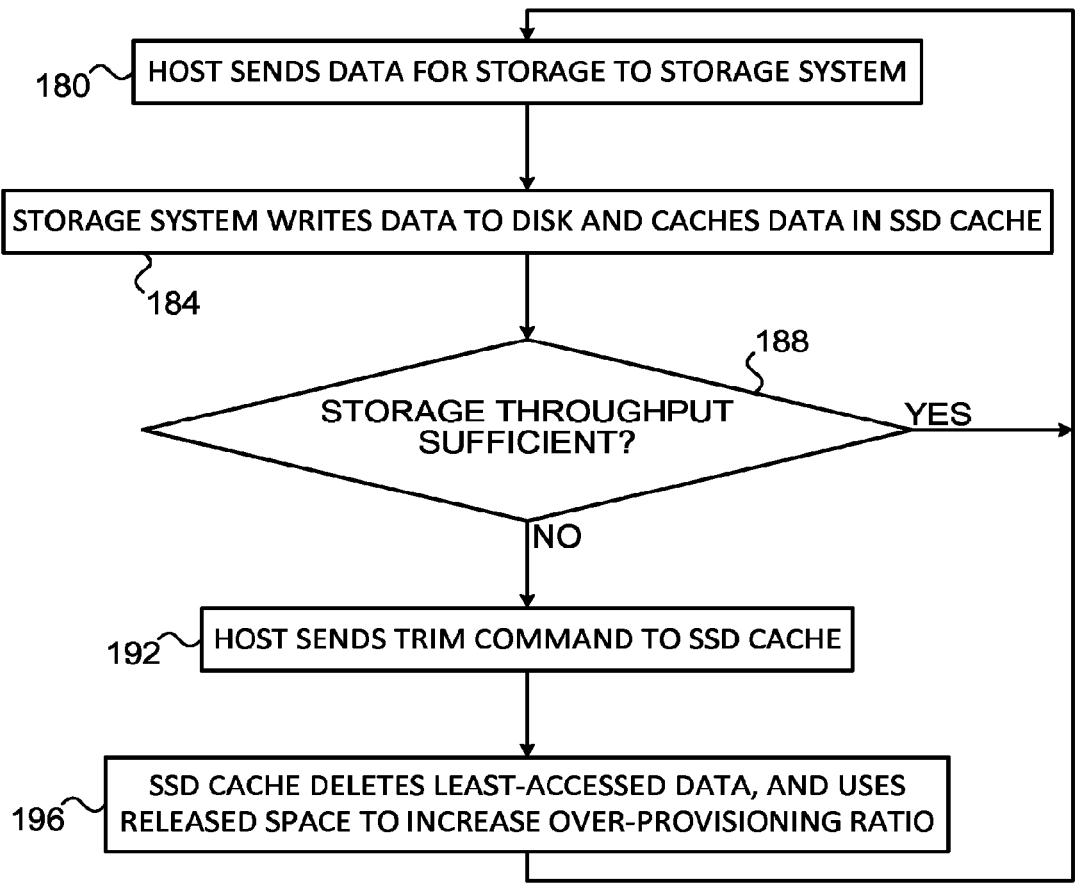
FIG. 7 is a flow chart that schematically illustrates a method for data storage, in accordance with an embodiment of the present invention.

FIG. 7 is a flow chart that schematically illustrates a method for data storage, in accordance with an embodiment of the present invention. The method begins with host 164 sending data items for storage in storage system 160, at a data sending step 180. System 160 caches the data items in SSD 172, and also stores the data items in long-term storage device 168, at a storage and caching step 184. Host 164 checks whether the current storage throughput of system 160 is sufficient, at a throughput checking step 188. If sufficient, the method loops back to step 180 above, and the host continues to send data items for storage.

If, on the other hand, the current storage throughput of system 160 is insufficient, the host sends a "cache trim" command to SSD 172, at a trim requesting step 192. The command requests SSD 172 to free some cache memory resources in order to increase the throughput. In response to the trim command, SSD 172 deletes one or more data items and uses the released memory space to increase the over-provisioning overhead, at an over-provisioning increasing step 196. SSD 172 may select data items for deletion based on any suitable criterion, such as the least-accessed items or the oldest items. The increased over-provisioning overhead increases the storage throughput of SSD 172. The method then loops back to step 180 above.

Additional Embodiments and Variations

In some applications, some or all of the data that is provided for storage in system 20 is also backed-up in another storage location. For example, system 20 may be part of a redundant storage system (e.g., Redundant Array of Independent Disks—RAID). As another example, system 20 may comprise a SSD in a mobile computer, which backs-up data to another storage location using a network connection when it is connected to a network.

In some embodiments, SSD controller 32 is notified whether or not certain data is backed-up in another location in addition to system 20. In an example embodiment, host 24 and SSD controller 32 support a command interface, using which the host informs the SSD controller whether a given data item that is sent for storage is backed-up in an additional location. The status of a given data item may change over time. For example, in a mobile computer application, a given data item may be stored exclusively in system 20 while the computer is disconnected from a network (e.g., mobile), and then be backed-up over a network connection when the mobile computer connects to the network. In some embodiments, processor 44 adjusts the over-provisioning overhead based on these notifications.

For example, when the notifications indicate that a given data item is backed-up in another location in addition to system 20, it may be permissible to store this data item in system 20 at reduced storage reliability. Therefore, processor 44 may store the given data item at a denser storage configuration having reduced storage reliability (e.g., using less ECC redundancy and/or using more bits/cell). The extra memory space that is freed by the denser storage configuration can be used to increase the over-provisioning ratio. In some embodiments, SSD controller 32 applies internal RAID in system 20, i.e., stores data items in system 20 using RAID redundancy. When a given data item is known to be backed-up externally to system 20, processor 44 may store this data item without internal RAID redundancy.

In some scenarios, the host informs the SSD controller that a given data item, which was not previously backed-up in another location, is now backed-up. For example, a mobile computer may at some point be connected to a network connection, which enables backup of locally-stored data items to remote storage. Upon receiving such a notification, the SSD controller may change the storage configuration of this data item, and modify the over-provisioning overhead accordingly.

In some embodiments, one or more of memory devices 28 are assigned as spare devices that are not used for normal data storage. If a given memory device 28 fails, it is replaced by one of the spare memory devices. In some embodiments, when a spare device is not used to replace a faulty device, it can be used as an additional over-provisioning area.

Typically, system 20 is specified to provide a certain endurance, e.g., to endure a certain number of programming cycles. Because of the "write amplification" effect described above, the system-level endurance specification translates to a higher endurance requirement from devices 28. When system 20 comprises multiple memory devices 28, the memory devices may differ from one another in their endurance levels, e.g., in the number of programming and erasure cycles they are able to endure. In some cases, the endurance level of each memory device can be estimated or predicted.

In some embodiments, processor 44 individually assigns each memory device 28 a respective range of logical addresses, whose size matches the expected endurance of the memory device. The remaining physical memory space of each memory device is used for over-provisioning. Consider, for example, a system comprising 1 GB memory devices (i.e., the physical storage size of each device is 1 GB). Some of these devices may have high endurance, while others may have poorer endurance, e.g., because of statistical manufacturing process variations among the devices.

In an example embodiment, processor 44 may assign each higher-endurance device a logical address range of 900 MB, and use an over-provisioning ratio of 10% on these devices. For the lower-endurance devices, processor 44 may assign an address range of 800 MB, and use an over-provisioning ratio of 20% on these devices. As a result, a lower-endurance device will need to handle a smaller number of programming cycles relative to a high-endurance device. Assuming a statistical mixture of higher- and lower-endurance devices, the system-level endurance specification can be met without discarding lower-endurance devices. This technique increases manufacturing yield and thus reduces cost.

The description above refers to setting separate, possibly different over-provisioning overheads to different memory devices 28. Alternatively, processor 44 may assign separate, possibly different over-provisioning overheads to any other suitable group of memory cells, e.g., to different planes or different dies within a given memory device 28. The appropriate over-provisioning overhead for each cell group or device can be determined, for example, during manufacturing tests.

The following analysis demonstrates the potential value of assigning different over-provisioning overheads to different memory portions. In many practical cases, the write amplification factor can be approximated by 1/OP, wherein OP denotes the over-provisioning ratio. Consider an example scenario in which a certain portion 0<P<1 of the memory can endure C1 P/E cycles, and the remaining 1-P of the memory can endure C2>C1 cycles. This scenario also assumes purely random (i.e., non-sequential) programming of the memory. Let S denote the logical capacity of the memory.

If both portions of the memory were assigned the same OP, both portions will first perform $C1 \cdot OP \cdot S$, and then P of the blocks will end their life. If P>OP, then the entire memory will end its life. Otherwise, the memory will continue operating with an over-provisioning ratio of OP-P. Thus, the total amount of data that can be written during memory lifetime is:

$$A=(C1 \cdot OP + MAX\{0,(C2-C1) \cdot (OP-P)\}) \cdot S, \quad [1]$$

wherein S denotes the logical size of the memory.

Consider, on the other hand, an implementation in which the memory portions P and (1−P) are assigned different over-provisioning ratios OP1 and OP2, respectively. OP1 and OP2 are selected such that both portions end their life after approximately the same number of user cycles, i.e.:

$$C1 \cdot OP1 = C2 \cdot OP2. \quad [2]$$

Since only a portion OP of the memory can be used for over-provisioning, $P \cdot OP1+(1-P) \cdot OP2 \leq OP$. Therefore, if all the over-provisioning area is utilized, we can write:

$$OP2=(OP-P \cdot OP1)/(1-P) \quad [3]$$

Solving Equations [2] and [3] gives:

$$OP1=C2 \cdot OP/((1-P)C1+P \cdot C2) \quad [4]$$

$$OP2=C1 \cdot OP/((1-P) \cdot C1+P \cdot C2)$$

The total amount of data that can be written during the lifetime of the memory is thus:

$$A'=C1 \cdot C2/((1-P)C1+P \cdot C2) \cdot OP \cdot S \quad [5]$$

Consider, for example, two numerical examples where OP=25%. If, for example, C1=20K cycles, C2=50K cycles and P=10%, then $A=9500 \cdot S$ and $A'=10870 \cdot S$. If P would be 0 then A' would reach $12500 \cdot S$. As can be seen, A' is considerably greater than A, meaning that assigning over-provisioning overheads separately to different memory portions based on endurance can potentially increase the total endurance of the memory.

As another example, if C1=30K cycles, C2=50K cycles and P=10%, then $A=7500 \cdot S$ and $A'=9375 \cdot S$, i.e., a 25% improvement. Using SLC storage in portion P of the memory can only improve the endurance by a factor of less than 1/(1−P), even if the SLC has infinite endurance: If, for example, C1=50K cycles, C2=1000K cycles and P=90%, then $A=12500 \cdot S$ and $A'=12500 \cdot S/0.9$. For cases where P<OP, A' may be lower than A. For example, if C1=10 cycles, C2=50K cycles and P=0.01, then $A=12000 \cdot S$ and $A'=250 \cdot S$.

The above analysis can be generalized to an implementation in which n memory segments whose relative sizes are denoted P1 . . . Pn and whose endurances are denoted C1 . . . Cn. Again, the write amplification factor is approximated by 1/OP. The n segments are assigned over-provisioning ratios denoted OP1 . . . OPn, which are selected such that all n segments end their life approximately after the same number of user cycles:

$$Ci \cdot OPi = K, i=1 \ldots n \quad [6]$$

wherein K is a constant. If OP denotes the overall over-provisioning ratio of the entire memory, we are limited by the constraint:

$$\Sigma 1(i=1 \ldots n) \, Pi(OPi) = OP \quad [7]$$

From solving Equations [6] and [7] we can approximate that the total amount of data that can be written over the lifetime of the memory is $$A''=C'' \cdot OP \cdot S \quad [8]$$

wherein S denotes the logical size of the memory, and C" denotes the harmonic average of the endurances of the segments of the SSD:

$$C^P = \frac{1}{\sum_{i=1\ldots n}\left(\frac{Pi}{Ci}\right)}. \qquad [9]$$

Consider, for example, a memory in which 50% of the blocks can endure 20K cycles and 50% can endure 50K cycles. By appropriate allocation of over-provisioning ratios to the different blocks, the memory can achieve an effective endurance of C"=1/(0.5/20000+0.5/50000)=28570 cycles, instead of 20000 cycles using conventional schemes and even wear leveling.

In some embodiments, processor 44 selects blocks for garbage collection and erasure based on their estimated endurance. Thus, for example, blocks that are estimated to have long endurance will be compacted and erased when they contain a certain number of invalid pages (e.g., ten pages), whereas blocks that are estimated to have short endurance will be compacted and erased only when they reach a higher number of invalid pages (e.g., twenty pages).

In some embodiments, e.g., in a SSD application, memory devices 28 are grouped in two or more groups that are referred to as channels. Upon receiving a given data item for storage, processor 44 selects one of the channels, and sends the data item for storage in the selected channel. In some embodiments, processor 44 assigns a respective over-provisioning ratio individually for each channel. The over-provisioning ratio may differ from one channel to another. The processor selects a channel for storing a given data item based on the over-provisioning ratios. For example, processor may send an incoming data item for storage in the channel that currently has the highest over-provisioning overhead among all the channels.

In some embodiments, each memory device 28 (or each die within each memory device) is assigned a respective sub-range of logical addresses. In the event that a given device fails, processor 44 may re-map the logical addresses to devices 28, so as to divide the overall range of logical addresses among the remaining functional devices. When re-mapping the logical addresses, processor 44 reduces the over-provisioning ratio slightly. As a result, the system can remain operational without re-formatting. The re-mapping and over-provisioning reduction process can be performed gradually, e.g., for subsequent write operations.

In some embodiments, processor 44 stores some of the data in memory devices 28 at a certain storage density (e.g., SLC) and some of the data at a different storage density (e.g., MLC). In particular, processor 44 may store frequently-changed data ("hot data") at a certain high-endurance and high-speed storage configuration (e.g., SLC), and rarely-changed data ("cold data") at a lower-endurance and lower-speed but lower-cost storage configuration (e.g., MLC). In some embodiments, processor 44 may change the relative portion of the data that is stored using the first storage density changes over time. For example, the proportion between the volumes of "hot" and "cold" data may change over time.

In an embodiment, processor 44 reacts to such a change by modifying the memory spaces that are allocated to the two storage densities (e.g., increase the SLC space at the expense of MLC space, or vice versa). As a result of this modification, the ratio between the physical capacity of the memory and the user capacity of the memory changes, as well. For example, allocating more memory to SLC storage and less memory to MLC storage reduces the physical capacity of the memory, and vice versa. Therefore, changing the relative memory allocation to the different storage densities changes the over-provisioning ratio of the system.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. An apparatus, comprising:
a cache memory;
a long-term storage unit; and
a controller, wherein the controller is configured to:
receive data from a host for storage;
store the received data in the cache memory;
delete one or more data items from the cache memory responsive to a receiving a trim command from the host; and
increase an over-provisioning ratio dependent upon memory space in the cache memory released by deleting the one or more data items.

2. The apparatus of claim 1, wherein to store the received data in the cache memory, the controller is further configured to store the received data in the long-term storage unit.

3. The apparatus of claim 1, wherein to delete the one or more data items the controller is further configured to determine a number of times each data item stored in the cache memory has been accessed.

4. The apparatus of claim 1, wherein to delete the one or more data items the controller is further configured to determine a duration each data item in the cache memory has been stored.

5. The apparatus of claim 1, wherein the controller is further configured to adaptively modify the over-provisioning ratio.

6. The apparatus of claim 1, wherein the cache memory comprises a plurality of non-volatile memory cells.

7. The apparatus of claim 1, wherein the long-term storage unit includes a magnetic disk.

8. A method for data storage, comprising:
receiving data from a host for storage;
storing the received data in a cache memory;
deleting one or more data items from the cache memory responsive to receiving a trim command from the host; and
increasing an over-provisioning ratio in the cache memory dependent upon memory space in the cache memory released by deleting the one or more data items.

9. The method of claim 8, wherein storing the received data in the cache memory comprises storing the data in a long-term storage unit.

10. The method of claim 8, wherein receiving the trim command from the host comprises sending, by the host, the trim command responsive to a determination that a rate of data storage has decreased.

11. The method of claim 8, wherein receiving the trim command from the host comprises sending, by the host, the trim command responsive to a determination that a rate of data storage is less than a predetermined rate.

12. The method of claim 8, wherein deleting the one or more data items from the cache memory comprises determining a duration each data item in the cache memory has been stored.

13. The method of claim 8, wherein deleting the one or more data items from the cache memory comprises determining a number of times each data item in the cache memory has been accessed.

14. The method of claim 8, wherein the cache memory includes a plurality of non-volatile memory cells.

15. A system, comprising:
   a storage unit; and
   a host processor configured to send data to the storage unit;
   wherein the storage unit includes a cache memory, and wherein the storage unit is configured to:
      receive the data sent by the host; and
      store the received data in the cache memory;
   wherein the host processor is further configured to send a trim command to the cache memory; and
   wherein the storage unit is further configured to:
      delete one or more data items from the cache memory responsive to receiving the trim command sent by the host; and
      increase an over-provisioning ratio in the cache memory dependent upon memory space in the cache memory released by deleting the one or more data items.

16. The system of claim 15, wherein the storage unit further includes a long-term storage unit, and wherein to store the received data in the cache memory, the storage unit is further configured to store the received data in the long-term storage unit.

17. The system of claim 15, wherein to send the trim command to the storage unit, the host processor is further configured to send the trim command responsive to a determination that a rate of data storage to the storage unit has decreased.

18. The system of claim 15, wherein to send the trim command to the storage unit, the host processor is further configured to send the trim command responsive to a determination that a rate of data storage to the storage unit is less than a predetermined rate.

19. The system of claim 15, wherein to delete the one or more data items from the cache memory, the storage unit is further configured to determine a number of times each data item stored in the cache memory has been accessed.

20. The system of claim 15, wherein the cache memory includes a plurality of non-volatile memory cells.

* * * * *